United States Patent
Kimura (10) Patent No.: US 6,366,385 B2
(45) Date of Patent: Apr. 2, 2002

(54) MULTI-BEAM SCANNING OPTICAL SYSTEM AND IMAGE FORMING APPARATUS USING THE SAME

(75) Inventor: Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/733,065

(22) Filed: Dec. 11, 2000

(30) Foreign Application Priority Data

Dec. 14, 1999 (JP) .......................................... 11-354080

(51) Int. Cl.⁷ .............................................. G02B 26/08
(52) U.S. Cl. ...................... 359/204; 347/243; 347/235; 359/216
(58) Field of Search ...................... 359/204, 216–219; 347/233, 234, 235, 243, 244

(56) References Cited

U.S. PATENT DOCUMENTS 5,870,132 A * 2/1999 Inoue et al. ................. 347/243

OTHER PUBLICATIONS

U.S. application No. 09/694,502, filed Oct. 24, 2000.

* cited by examiner

Primary Examiner—James Phan
(74) Attorney, Agent, or Firm—Fitzpatrick, Cella, Harper & Scinto (57) ABSTRACT

A multi-beam scanning optical system includes a light source having a plurality of light-emission points, an incident optical system for guiding a plurality of light beams emitted from the light source to a deflector, a scanning optical system for forming the plurality of light beams reflected/deflected by the deflector into images on a scanned surface, and a synchronization detection device in which a part of the plurality of light beams from the deflector are reflected at a predetermined angle in a sub-scanning cross-section by using a mirror to be scanned on a surface of a slit member and to be guided to a surface of a synchronization detection element via the slit member, and a timing at a scanning start position on the scanned surface is controlled by using a signal from the synchronization detection element. The slit member is positioned such that a plurality of light beams scanned on a surface of a slit opening are substantially vertically scanned on the slit opening.

18 Claims, 5 Drawing Sheets

MULTI-BEAM SCANNING OPTICAL SYSTEM AND IMAGE FORMING APPARATUS USING THE SAME

BACKGROUND OF THE INVENTION

1. Field of the Invention

The present invention relates to a multi-beam scanning optical system and an image forming apparatus using the same and, more particularly, to a multi-beam scanning optical system suitably used for an image forming apparatus, e.g., a laser beam printer (LBP) or digital copying machine, which can obtain a high-resolution, high-quality image without any print position error in the main scanning direction by properly placing a slit member as a constituent element of a synchronization detection means.

2. Related Background Art

Conventionally, as a method of enabling high-speed optical scanning, a method (multi-beam scanning optical system) of simultaneously scanning a plurality of beams of light (light beams) on a scanned surface and forming a plurality of scanning lines at predetermined intervals on the scanned surface by using a multi-beam light source (multi-laser light source) as a laser light source is known. As multi-laser sources that can be used in such a multi-beam scanning optical system, for example, the following light sources are available:

(1) a light source having a plurality of emission points (light-emitting portions) on one chip;

(2) a light source in which a plurality of laser emission elements are used to combine optical paths by a beam splitter; and (3) a light source for splitting one light beam into a plurality of light beams by using a beam splitter and independently driving modulators provided for the respective split light beams.

Figure 5:
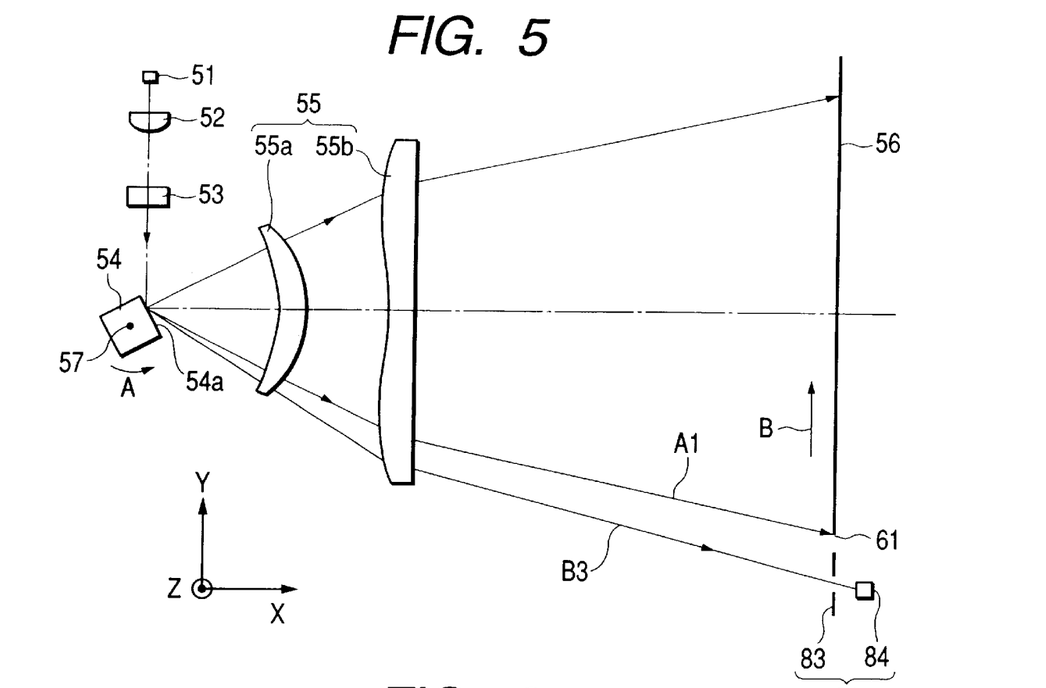
FIG. 5 is a main scanning sectional view of a conventional multi-beam scanning optical system.

FIG. 5 is a schematic view showing the main part of a conventional multi-beam scanning optical system having two light emission points on one chip.

Referring to FIG. 5, a plurality of light beams optically modulated in accordance with image information and emitted from a multi-beam semiconductor laser 51 serving as a multi-laser source are converted into substantially parallel light beams or convergent beams by a collimator lens 52 and strike a cylindrical lens 53. Of the light beams incident on the cylindrical lens 53, the light beams emerge without any change in a main scanning cross-section but converge in a sub-scanning cross-section to be formed into substantially linear images (linear images elongated in the main scanning direction) on a deflecting surface (reflecting surface) 54a of an optical deflector 54. The plurality of light beams reflected/deflected by the deflecting surface 54a of the optical deflector 54 are formed into spots on a scanned surface 56 by an imaging optical system (f-θ lens system) 55 having first and second f-θ lenses 55a and 55b exhibiting different powers in a sub-scanning cross-section. By rotating the optical deflector 54 in the direction indicated by an arrow A, the light beams are scanned on the scanned surface 56 in the direction indicated by an arrow B (main scanning direction) at a constant speed. Note that FIG. 5 shows only one light beam.

In this multi-beam scanning optical system, to accurately control the write position of an image, a synchronization detection means is generally placed immediately before a position where an image signal is written.

Referring to FIG. 5, a slit member (BD slit) 83 is placed at a position equivalent to the photosensitive drum surface 56. An optical sensor (BD sensor) 84 serves as a synchronization detection element. Note that each of the BD slit 83, BD sensor 84, and the like forms one element of a synchronization detection means 91.

Referring to FIG. 5, the timing at the scanning start position of image recording on the photosensitive drum surface 56 is adjusted by using an output signal from the BD sensor 84.

Figure 6:
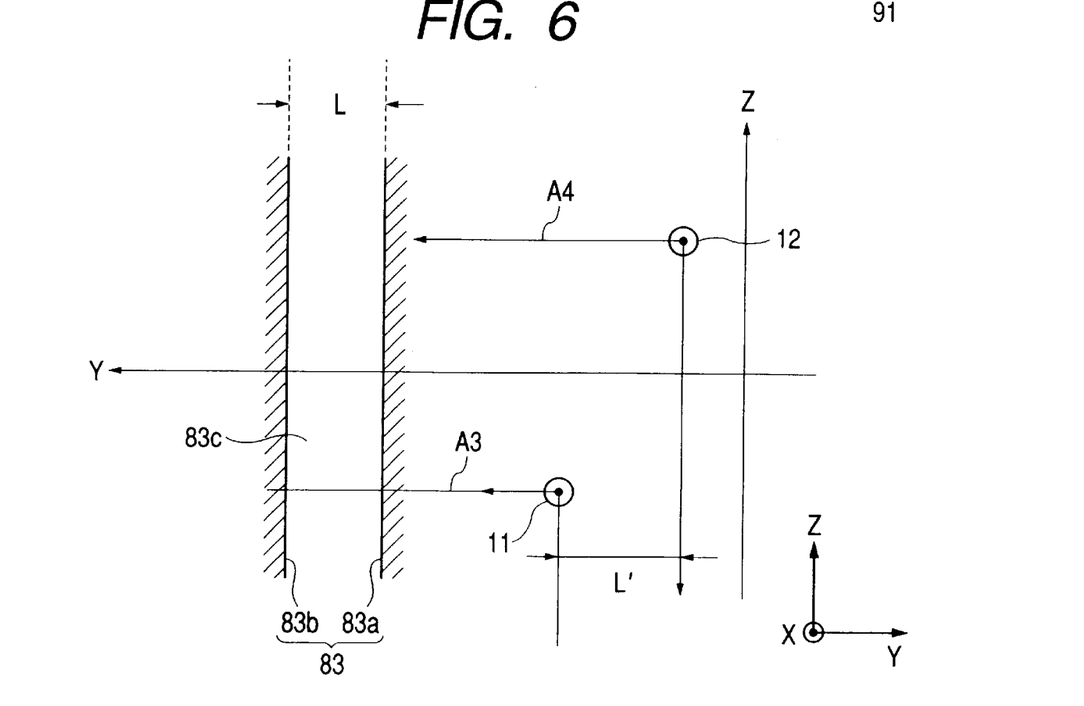
FIG. 6 is an enlarged view of a portion near a BD slit portion in the prior art.

FIG. 6 is a sectional view showing the main part of the BD slit 83 in FIG. 5 when viewed from the light beam incident side. Referring to FIG. 6, the BD slit 83 has first and second edge portions 83a and 83b. The first and second edge portions 83a and 83b are arranged parallel to the Z-axis in the coordinate system in FIG. 6. First and second laser spots 11 and 12 of a plurality of light beams (BD light beams) for synchronization detection are formed on the BD slit 83 surface. When the optical deflector 54 rotates in the direction indicated by the arrow A in FIG. 5, the first and second laser spots 11 and 12 are respectively scanned in the directions indicated by arrows A3 and A4 in FIG. 6.

As shown in FIG. 6, the first and second laser spots 11 and 12 are spaced apart from each other by predetermined distances in the main scanning direction (Y-axis direction) and sub-scanning direction (Z-axis direction). If the distance in the main scanning direction is represented by L', the first and second laser spots 11 and 12 are scanned on the scanned surface 56 while always being spaced apart from each other by the distance L' in the main scanning direction at the same time.

A scanning start point 61 (image writing start position) of a plurality of light beams A1 for image formation on the scanned surface 56 is determined as follows.

Assume that BD detection corresponds to the timing at which a BD light beam B3 strikes the BD sensor 84 placed above the scanned surface 56 on the upstream side in the main scanning direction. This BD detection is independently performed for each light beam, and image writing starts a predetermined time delay after the BD detection.

To more accurately detect the timing at which the BD light beam B3 strikes the BD sensor 84, the BD slit 83 is placed in front of the BD sensor 84. As described above, the BD slit 83 is made up of the first and second edge portions 83a and 83b. A distance L between the first and second edge portions 83a and 83b in the main scanning direction is set to be smaller than the distance L' between the first and second laser spots 11 and 12 in the main scanning direction. This setting prevents the first and second laser spots 11 and 12 from simultaneously striking the BD sensor 84. By scanning the first and second laser spots 11 and 12, therefore, first and second detection signals can be independently obtained from the BD sensor 84. The timing of BD detection is then specified by the time when a predetermined slice level is attained at the leading edge or trailing edge of a detection signal.

Since the first and second edge portions 83a and 83b are arranged parallel to the Z-axis in the coordinate system in FIG. 6, the respective light beams travel the same distance from the BD detection positions to the image writing start positions with the same delay time. This makes it possible to reduce variations in image writing start positions for the respective light beams.

In this multi-beam scanning optical system, a photosensitive device (not shown) serving as a recording medium is placed on the scanned surface 56 and is exposed by laser modulation driving based on image information. The resultant image is then visualized by a known electrophotographic process. In this manner, an image forming apparatus such as a laser printer or digital copying machine can be implemented.

If the distance from the BD sensor to an image writing start position changes depending on the dimensional precision of components and the focal length of an optical component, the delay time from BD detection to an image writing start position may be adjusted by a known method, e.g., shifting at least some of the elements constituting the synchronization detection means in a direction perpendicular to the optical axis.

The conventional multi-beam scanning optical system described above has the following problems.

(1) If a return mirror is inserted in an optical path for synchronization detection to bend the optical path in a main scanning cross-section and sub-scanning cross-section so as to make the multi-beam scanning optical system compact, jitter occurs in the main scanning direction. More specifically, if the optical path in the multi-beam scanning optical system is bent, the plane formed by a light beam scanned on the BD slit 83 for synchronization detection tilts with respect to the first and second edge portions 83a and 83b. For this reason, each light beam is obliquely scanned on a slit opening 83c. As a consequence, the time intervals at which a plurality of light beams are scanned on the slit opening 83c differ from the time intervals at which a plurality of light beams are scanned on the scanned surface, resulting in a failure to obtain a correct sync signal.

In addition, when each light beam is obliquely scanned on the slit opening 83c, the respective light beams travel different distances from the BD detection positions to the image writing start positions. If this apparatus is driven while the delay times between BD detection and image writing start positions remain the same, the image writing start positions shift from each other in a cycle of the number of light beams. As a result, an image is observed as jitter in the main scanning direction with a straight line in the sub-scanning direction becoming jagged.

To prevent this, the apparatus may be driven with different delay times being set between BD detection and image writing start positions for the respective light beams. This method, however, requires an independent delay circuit for each light beam, resulting in an increase in complexity of the overall apparatus and an increase in cost.

SUMMARY OF THE INVENTION

It is an object of the present invention to provide a multi-beam scanning optical system capable of high-speed printing operation, in which a slit member forming one element of a synchronization detection means for controlling the timing at a scanning start position on a scanned surface is set in a proper direction to prevent jitter in the main scanning direction and attain an improvement in image quality without requiring any complicated optical path arrangement, and an image forming apparatus using the multi-beam scanning optical system.

According to one aspect of the invention a multi-beam scanning optical system comprises light source means having a plurality of light-emission points incident optical means for guiding a plurality of light beams emitted from said light source means to deflection means scanning optical means for forming the plurality of light beams reflected/deflected by the deflection means into images on a scanned surface, and synchronization detection means in which a part of the plurality of light beams from the deflection means are reflected at a predetermined angle in a sub-scanning cross-section by reflection means to be scanned on a surface of a slit member and to be guided to a surface of a synchronization detection element via the slit member, and a timing at a scanning start position on the scanned surface is controlled by using a signal from the synchronization detection element, wherein the slit member is positioned such that a plurality of light beams scanned on a surface of a slit opening are substantially vertically scanned on the slit opening.

According to further aspect of the invention, the synchronization detection means controls a timing at a scanning start position on the scanned surface in a cycle of the plurality of light beams emitted from said light source means.

According to further aspect of the invention, a longitudinal direction of the slit opening of the slit member is nonparallel to a rotational axis direction of the deflection means.

According to further aspect of the invention, a plurality of light-emission points are spaced apart from each other in at least the main scanning direction.

According to further aspect of the invention, an image forming apparatus comprises the multi-beam scanning optical system set out in the foregoing, a photosensitive member disposed on the scanned surface, a developing unit for developing an electrostatic latent image formed on said photosensitive member by a light beam scanned by said multi-beam scanning optical system into a toner image, a transfer unit for transferring the developed toner image onto a transfer medium, and a fixing unit for fixing the transferred toner image on the transfer medium.

According to further aspect of the invention, an image forming apparatus comprises the multi-beam scanning optical system set out in the foregoing, and a printer controller for converting code data input from an external device into an image signal and inputting the signal to said multi-beam scanning optical system.

According to further aspect of the invention, a multi-beam scanning optical system comprises light source means having a plurality of light-emission points, incident optical means for guiding a plurality of light beams emitted from said light source means to deflection means, scanning optical means for forming the plurality of light beams reflected/deflected by the deflection means into images on a scanned surface, and synchronization detection means in which a part of the plurality of light beams from the deflection means are reflected at a predetermined angle in a sub-scanning cross-section by reflection means to be scanned on a surface of a slit member and to be guided to a surface of a synchronization detection element via the slit member, and a timing at a scanning start position on the scanned surface is controlled by using a signal from the synchronization detection element, wherein the slit member is positioned such that a plurality of light beams scanned on a surface of a slit opening vertically cross one of edge portions of the slit opening.

According to further aspect of the invention, the synchronization detection means controls a timing at a scanning start position on the scanned surface in a cycle of the plurality of light beams emitted from said light source means.

According to further aspect of the invention, a longitudinal direction of the slit opening of the slit member is nonparallel to a rotational axis direction of the deflection means.

According to further aspect of the invention, the plurality of light-emission points are spaced apart from each other in at least the main scanning direction.

According to further aspect of the invention, an image forming apparatus comprises the multi-beam scanning optical system set out in the foregoing, a photosensitive member disposed on the scanned surface, a developing unit for developing an electrostatic latent image formed on said photosensitive member by a light beam scanned by said multi-beam scanning optical system into a toner image, a transfer unit for transferring the developed toner image onto a transfer medium, and a fixing unit for fixing the transferred toner image on the transfer medium.

According to further aspect of the invention, an image forming apparatus comprises the multi-beam scanning optical system set out in the foregoing, and a printer controller for converting code data input from an external device into an image signal and inputting the signal to said multi-beam scanning optical system.

According to further aspect of the invention, a multi-beam scanning optical system comprises light source means having a plurality of light-emission points, incident optical means for guiding a plurality of light beams emitted from said light source means to deflection means, scanning optical means for forming the plurality of light beams reflected/deflected by the deflection means into images on a scanned surface, and synchronization detection means in which a part of the plurality of light beams from the deflection means are reflected at a predetermined angle in a sub-scanning cross-section by reflection means to be scanned on a surface of a slit member and to be guided to a surface of a synchronization detection element via the slit member, and a timing at a scanning start position on the scanned surface is controlled by using a signal from the synchronization detection element, wherein a longitudinal direction of the slit opening of the slit member is nonparallel to a rotational axis direction of the deflection means, and the slit member is positioned such that a plurality of light beams scanned on a surface of a slit opening are substantially vertically scanned in the longitudinal direction of the slit opening.

According to further aspect of the invention, the synchronization detection means controls a timing at a scanning start position on the scanned surface in a cycle of the plurality of light beams emitted from said light source means.

According to further aspect of the invention, the slit member is positioned to be vertical or substantially vertical to a plane formed by a plurality of light beams scanned on the surface of the slit member.

According to further aspect of the invention, the plurality of light-emission points are spaced apart from each other in at least the main scanning direction.

According to further aspect of the invention, an image forming apparatus comprises the multi-beam scanning optical system set out in the foregoing, a photosensitive member disposed on the scanned surface, a developing unit for developing an electrostatic latent image formed on said photosensitive member by a light beam scanned by said multi-beam scanning optical system into a toner image, a transfer unit for transferring the developed toner image onto a transfer medium, a fixing unit for fixing the transferred toner image on the transfer medium.

According to further aspect of the invention, an image forming apparatus comprises the multi-beam scanning optical system set out in the foregoing, and a printer controller for converting code data input from an external device into an image signal and inputting the signal to said multi-beam scanning optical system.

DETAILED DESCRIPTION OF THE PREFERRED EMBODIMENTS (First Embodiment)

Figure 1:
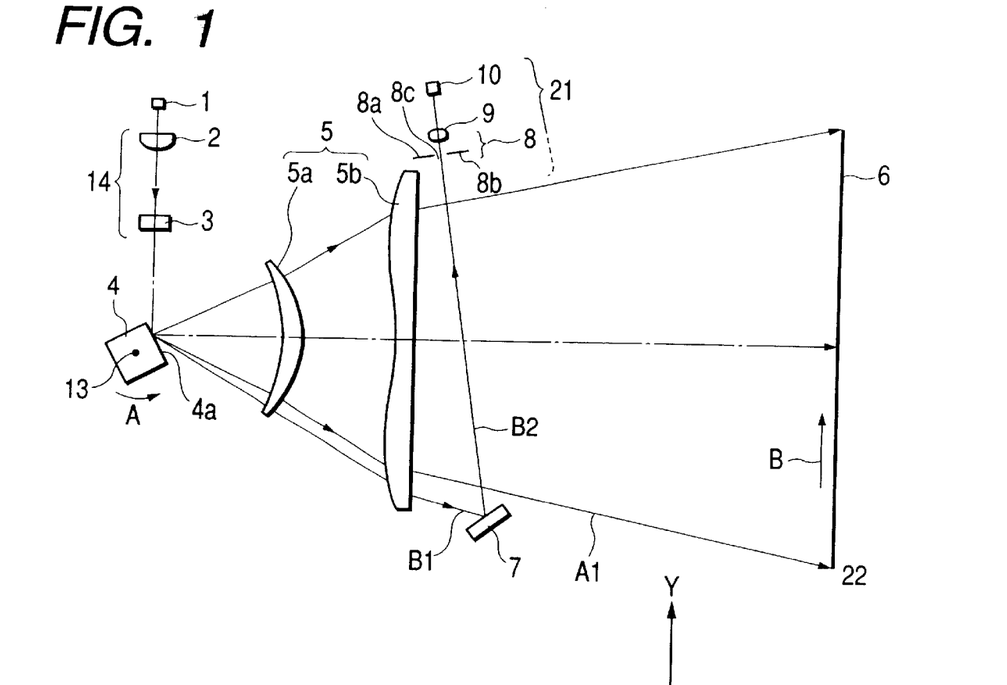
FIG. 1 is a main scanning sectional view of the first embodiment of the present invention.
Figure 2:
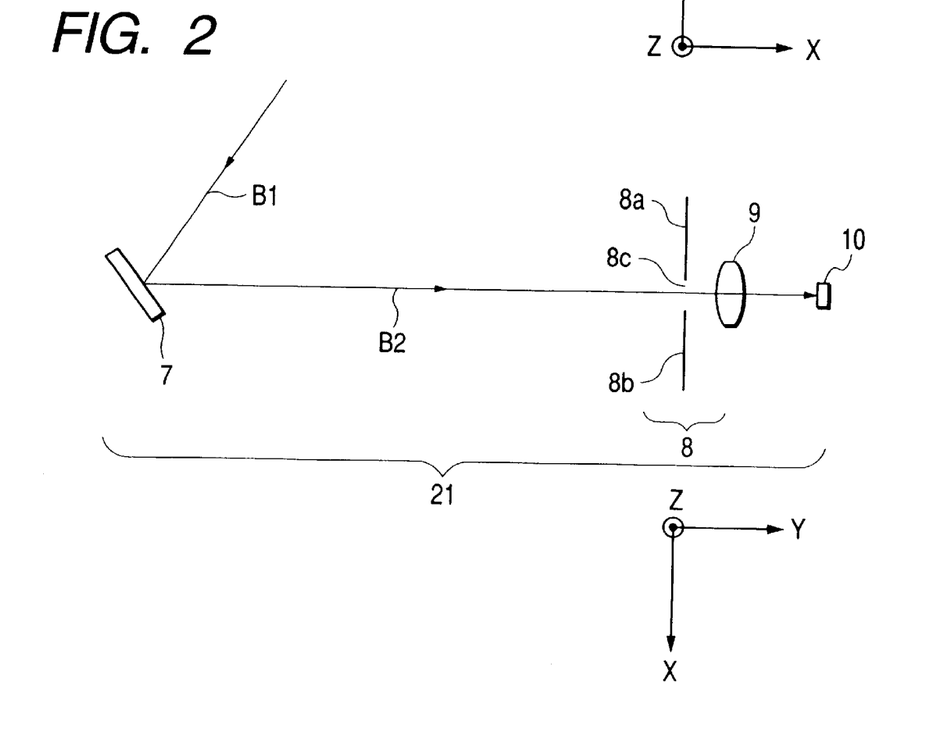
FIG. 2 is a main scanning sectional view of a portion around a BD sensor in the first embodiment of the present invention.
Figure 3:
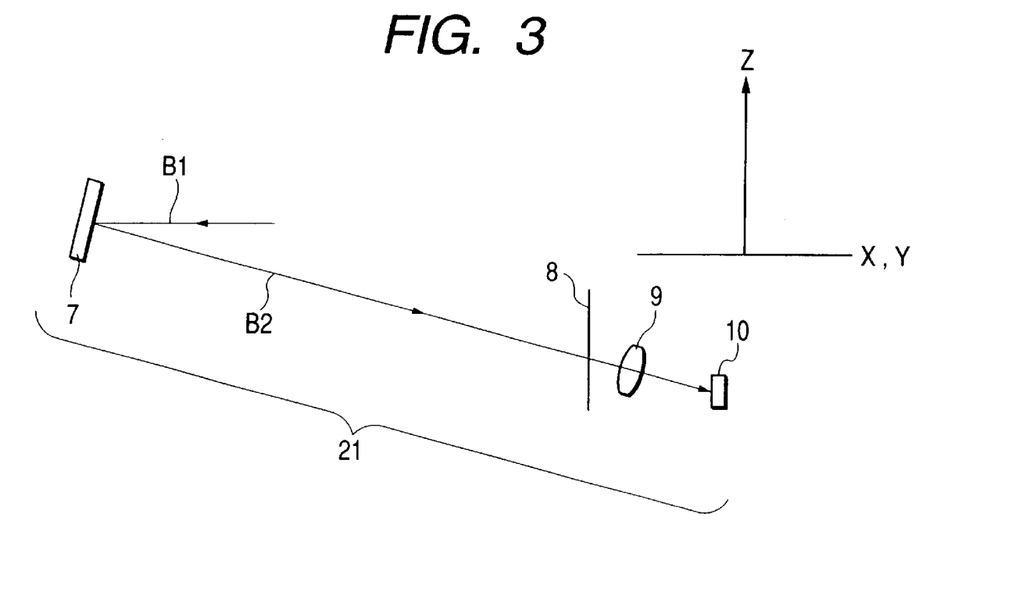
FIG. 3 is a sub-scanning sectional view of the portion around the BD sensor in the first embodiment of the present invention.

FIG. 1 is a sectional view (main scanning cross-section) of the first embodiment in the main scanning direction, in which a multi-beam scanning optical system of the present invention is applied to an image forming apparatus such as a laser beam printer or digital copying machine. FIG. 2 is a main scanning sectional view of a portion around a BD sensor in FIG. 1. FIG. 3 is a sub-scanning sectional view of the portion around the BD sensor in FIG. 1.

Note that in this specification, a direction in which a light beam is reflected/deflected (deflection scanning) by an optical deflector is defined as a main scanning direction, and a direction perpendicular to the optical axis of a scanning optical system and the main scanning direction is defined as a sub-scanning direction.

Figure 7:
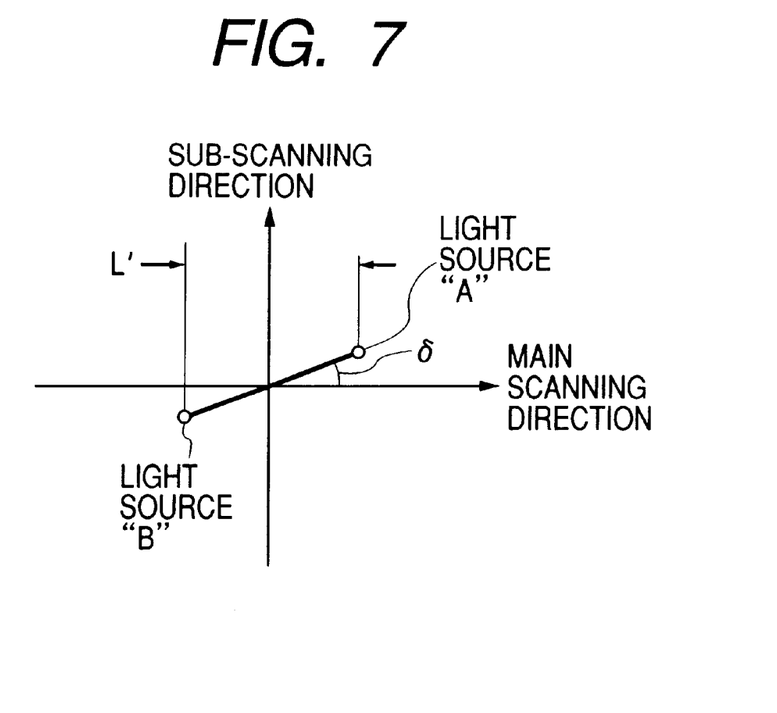
FIG. 7 is a view showing an example of the arrangement of a multi-beam light source in the present invention.

Referring to FIG. 1, a light source means 1 is formed by a monolithic multi-beam semiconductor laser having two light sources A and B arranged on one chip to be spaced apart from each other in the main scanning direction and sub-scanning direction, as shown in FIG. 7. A collimator lens 2 converts light beams emitted from the multi-beam semiconductor laser 1 into substantially parallel light beams or convergent light beams. A cylindrical lens (cylinder lens) 3 has a predetermined refracting power in only a sub-scanning cross-section. Note that each of the collimator lens 2, cylindrical lens 3, and the like forms one element of an incident optical means 14. Note that an aperture stop may be placed in an incident optical means 14.

An optical deflector 4 serving as a deflection means is formed by, for example, a polygon mirror (rotary polyhedral mirror), which is rotated at a uniform speed in the direction indicated by an arrow A in FIG. 1 by a driving means (not shown) such as a polygon motor.

A scanning optical means (imaging optical system) 5 has f-θ characteristics and a function to correct a tilt of the deflection surface. The scanning optical means 5 has first and second f-θ lenses 5a and 5b and serves to form a light beam based on image information and reflected/deflected by the optical deflector 4 into an image on a photosensitive drum surface 6 serving as a scanned surface. The first and second f-θ lenses 5a and 5b are formed by anamorphic lenses having different powers in a sub-scanning cross-section.

The photosensitive drum surface (recording medium surface) 6 serve as a scanned surface.

A reflection means 7 is formed by a return mirror (to be also referred to as a "BD mirror" hereinafter), and reflects a synchronization detection light beam (to be also referred to as a "BD light beam") B1 for adjusting the timing at a scanning start position on the photosensitive drum surface 6 toward a synchronization detection element 10 (to be described later) at predetermined angles in a main scanning cross-section and sub-scanning cross-section.

A slit member (to be also referred to as a "BD slit" hereinafter) 8 has a slit opening 8c and first and second edge portions 8a and 8b in a linear form which a BD light beam B2 crosses via the BD mirror 7. The slit member 8 is placed at a position equivalent to the photosensitive drum surface 6 such that a plurality of BD light beams 2 scanned on the slit opening 8c plane are scanned on the slit opening 8c almost vertically.

An imaging lens 9 (to be also referred to as a "BD lens" hereinafter) serving as an imaging means is used to make the BD mirror 7 and synchronization detection element 10 substantially optically conjugate to each other. The imaging lens 9 corrects an optical face tangle error in the BD mirror 7 to reduce variations in light beams incident on the BD sensor 10.

In this embodiment, the synchronization detection element 10 (to be also referred to as a "BD sensor" hereinafter) adjusts the timing at a scanning start position of image recording on the photosensitive drum surface 6 by using a write position sync signal (BD signal) obtained by detecting an output signal from the BD sensor 10.

Each of the BD mirror 7, slit member 8, BD lens 9, BD sensor 10, and the like forms one element of a synchronization detection means (detection means) 21. The synchronization detection means 21 in this embodiment controls the timing at a scanning start position on the photosensitive drum surface 6 for each of a plurality of light beams emitted from the multi-beam semiconductor laser 1 (starting image writing a predetermined period of time after detection by the detection means). Note that the synchronization detection means 21 may control the timing at a scanning start position for at least one of a plurality of light beams.

In this embodiment, a plurality of light beams optically modulated in accordance with image information and emitted from the multi-beam semiconductor laser 1 are converted into substantially parallel light beams or convergent beams by the collimator lens 2 and strike the cylindrical lens 3. Of the light beams incident on the cylindrical lens 3, the light beams emerge in a main scanning cross-section without any change. The light beams converge in a sub-scanning cross-section to be formed into substantially linear images (linear images elongated in the main scanning direction) on a deflecting surface 4a of the optical deflector 4. The plurality of light beams reflected/deflected by the deflecting surface 4a of the optical deflector 4 are formed into spots on the photosensitive drum surface 6 by the scanning optical means 5. By rotating the optical deflector 4 in the direction indicated by an arrow A, the light beams are scanned on the photosensitive drum surface 6 in the direction indicated by an arrow B (main scanning direction) at a constant speed. With this operation, an image is recorded on the photosensitive drum surface 6 serving as a recording medium.

In this case, before the photosensitive drum surface 6 is optically scanned, in order to adjust the timing at a scanning start position on the photosensitive drum surface 6, some (BE light beams) of the plurality of light beams reflected/deflected by the optical deflector 4 are reflected by the BD mirror 7 to be scanned on the BD slit 8 surface, and are guided to the BD sensor 10 by the BD lens 9 via the BD slit 8. By using a BD signal obtained by detecting an output signal from the BD sensor 10, the timing at a scanning start position of image recording on the photosensitive drum surface 6 is adjusted. Note that FIG. 1 shows only one light beam.

In this embodiment, the BD light beam B1 reflected/deflected by the optical deflector 4 is deflected by the BD mirror 7 at predetermined angles in a main scanning cross-section (X-Y cross-section) and sub-scanning cross-section (X-Z cross-section), and propagates as the BD light beam B2 toward the BD sensor 10, as shown in FIGS. 1 to 3. At this time, if the optical path is bent in the main scanning cross-section and sub-scanning cross-section, jitter occurs in the main scanning direction, as described above.

Figure 4:
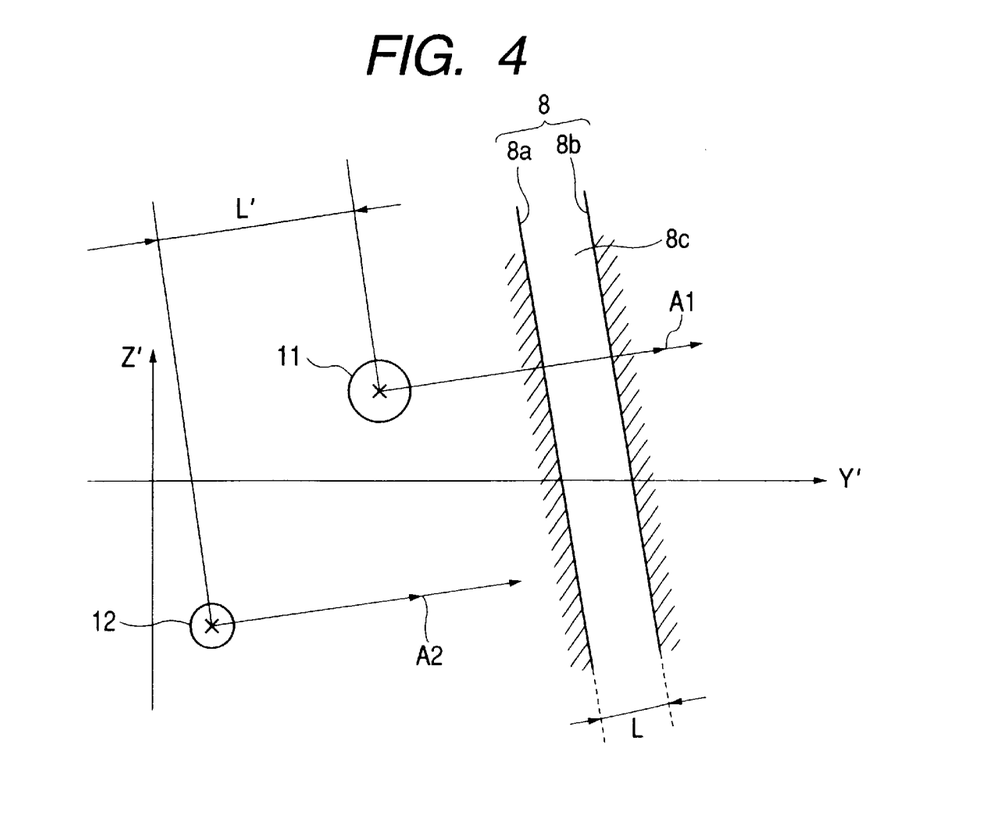
FIG. 4 is an enlarge view of a portion around a BD slit portion in the first embodiment of the present invention.

In this embodiment, therefore, as shown in FIG. 4, the BD slit 8 is positioned such that the plurality of BD light beams B2 scanned on the slit opening 8c plane are substantially vertically scanned on the rectangular slit opening 8c, thereby preventing jitter that occurs in the main scanning direction in a cycle of the number of a plurality of light beams. This makes it possible to attain an increase in speed and an improvement in image quality.

FIG. 4 is a sectional view showing the main part of the BD slit 8 when viewed from the incident side of the BD light beams B2. Referring to FIG. 4, a coordinate system Y'Z' is a local coordinate system on the BD slit 8, the Z'-axis obtained by shifting the Z-axis in FIG. 1 parallelly, and the coordinate system Y' is parallel to an X-Y plane in FIG. 1.

In this embodiment, as described above, the BD slit 8 is positioned such that the plurality of BD light beams B2 scanned on the slit opening 8c plane with the first edge portion 8a being parallel to the second edge portion 8b are substantially vertically scanned on the slit opening 8c. In addition, the BD slit 8 is positioned to be nonparallel to the Z'-axis in the coordinate system in FIG. 4, and the longitudinal direction (the longitudinal direction of the slit opening 8c) of the slit opening 8c of the BD slit 8 becomes nonparallel to the direction of a rotational axis 13 of the optical deflector 4. That is, the BD slit 8 is positioned such that the plurality of BD light beams B2 scanned on the slit opening 8c plane vertically cross the first and second edge portions 8a and 8b of the slit opening 8c.

First and second laser spots 11 and 12 of the plurality of BD light beams B2 are formed on the slit opening 8c plane. When the optical deflector 4 rotates in the direction indicated by the arrow A in FIG. 1, the first and second laser spots 11 and 12 are scanned in the directions indicated by arrows A1 and A2 in FIG. 4, respectively. A plane including the directions indicated by the arrows A1 and A2 coincides with the plane formed by the plurality of BD light beams B2 scanned on the slit opening 8c plane.

As shown in FIG. 4, the first and second laser spots 11 and 12 are spaced apart from each other by predetermined distances in the scanning direction (the direction indicated by arrows A1 and A2) and a direction perpendicular thereto, respectively. If the distance between the first and second laser spots 11 and 12 in the scanning direction is represented by L', the first and second laser spots 11 and 12 are scanned on the photosensitive drum surface 6 while always being spaced apart from each other by the distance L' in the scanning direction.

In this embodiment, a scanning start point 22 (image writing start position) of a plurality of image forming light beams A1 on the photosensitive drum surface 6 is determined as follows.

Assume that BD detection corresponds to the timing at which the BD light beam B2 strikes the BD sensor 10. This BD detection is independently performed for each light beam, and image writing starts a predetermined time delay after the BD detection.

In this embodiment, to more accurately detect the timing at which the BD light beam B2 strikes the BD sensor 10, the BD slit 8 is placed in front of the BD sensor 10. As shown in FIG. 4, the BD slit 8 is made up of the first and second edge portions 8a and 8b. A distance L between the first and second edge portions 8a and 8b in the main scanning direction is set to be smaller than the distance L' between the first and second laser spots 11 and 12 in the main scanning direction. This setting prevents the first and second laser spots 11 and 12 from simultaneously striking the BD sensor 10. By scanning the first and second laser spots 11 and 12, therefore, first and second detection signals can be independently obtained from the BD sensor 10. The timing of BD detection is then specified by the time when a predetermined slice level is attained at the leading edge or trailing edge of a detection signal.

As described above, since the BD slit 8 having the first and second edge portions 8a and 8b is positioned such that the plurality of BD light beams B2 scanned on the slit opening 8c plane are substantially vertically scanned on the slit opening 8c, the respective BD light beams B2 travel the same distance from the BD detection position to the image writing start positions with the same delay time. This makes it possible to reduce variations in image writing start positions for the respective light beams. In addition, in this embodiment, there is no need to prepare delay circuits with different delay times for the respective light beams, and hence the circuit arrangement can be simplified, leading to a reduction in cost.

If the distance from the BD sensor to an image writing start position changes depending on the dimensional precision of components and the focal length of an optical component, the delay time from BD detection to an image writing start position may be adjusted by a known method, e.g., shifting at least some of the elements constituting the synchronization detection means in a direction perpendicular to the optical axis, as described above.

In this embodiment, plastic lenses are used for some or all of the f-θ lens system 5, collimator lens 2, cylindrical lens 3, and the like constituting the multi-beam scanning optical system. This makes it possible to attain an improvement in performance owing to the formation of aspherical surfaces and a reduction in cost.

In this embodiment, the first and second edge portions 8a and 8b are formed such that the plurality of BD light beams B2 scanned on the slit opening 8c plane vertically cross the two edge portions. However, the BD light beams B2 may vertically cross only one of the edge portions. That is, effects similar to those of the first embodiment described above can be obtained even if the first and second edge portions 8a and 8b are formed to be nonparallel to each other.

The reason why the plurality of BD light beams B2 scanned on the slit opening 8c plane may vertically cross only one edge portion is that BD detection may be performed either at the first edge portion 8a on the BD light beam B2 incident side of the slit opening 8c or at the second edge portion 8b on the BD light beam B2 exit side of the slit opening 8c.

In the first embodiment, the number of emission points (light sources) is two. However, the present invention is not limited to two, and can be applied to a case wherein three or more beams are used.

In the first embodiment, the monolithic multi-beam semiconductor laser is used. However, the present invention is not limited to a monolithic laser. The present invention can also be applied to a hybrid scheme of forming a multi-laser light source by preparing a plurality of laser elements each designed to emit a single beam or a plurality of beams, and combining optical paths using a beam combining optical system such as a polarization beam splitter.

In the present invention, a plurality of BD light beams are reflected by the BD mirror 7 at a predetermined angle in a sub-scanning cross-section so as to be scanned on the BD slit 8 surface. The "predetermined angle" indicates the angle through which each light beam is rotated clockwise or counterclockwise with respect to a main scanning cross-section including a linear image elongated in the main scanning direction which is formed on the deflecting surface 4a of the optical deflector 4, as shown in FIG. 3, and a tilt is defined by the BD light beams B1 and B2 in a sub-scanning cross-section owing to the BD mirror 7. The synchronization detection means 21 is therefore located above or below the main scanning cross-section including the linear image elongated in the main scanning direction.

In this embodiment, the BD mirror 7 is used for a compact structure. This effect is noticeable especially in a form having the synchronization detection means 21 located above or below the f-θ lens system 5.

Figure 8:
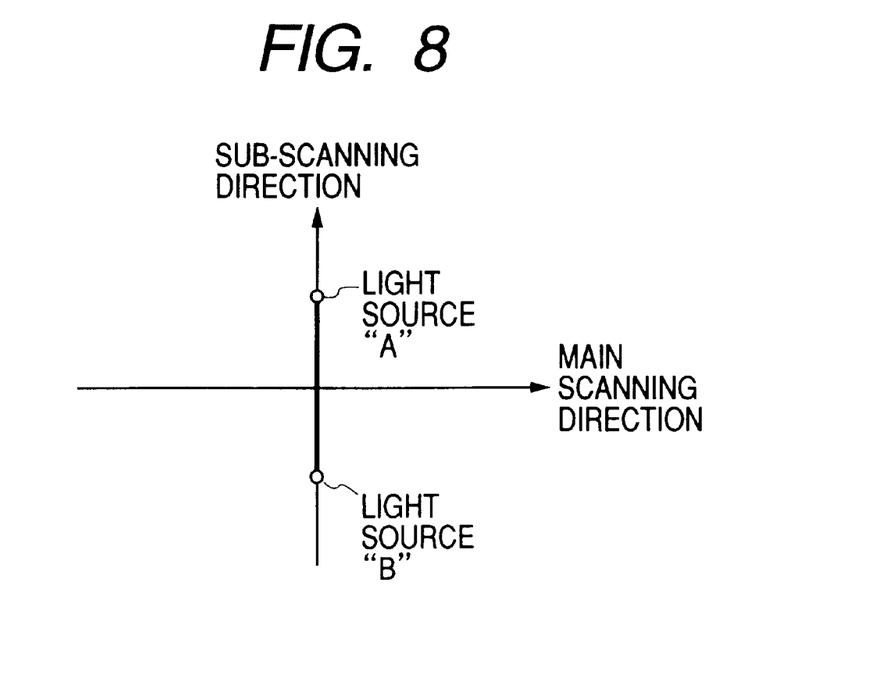
FIG. 8 is a view showing another example of the arrangement of a multi-beam light source in the present invention.

In the first embodiment, the two emission points (light sources) are spaced apart from each other in the main scanning direction and sub-scanning direction. However, the present invention can be applied to a form in which two emission points (light sources) are spaced apart from each other in only the sub-scanning direction, as shown in FIG. 8. In this case, BD sensors equal in number to BD light beams are preferably arranged. For example, one BD sensor is preferably provided for each of two BD light beams, and a total of two BD sensors are preferably arranged in a multi-beam scanning optical system. In addition, the present invention can be applied to a form in which two emission points (light sources) are spaced apart from each other in only the main scanning direction.

Figure 9:
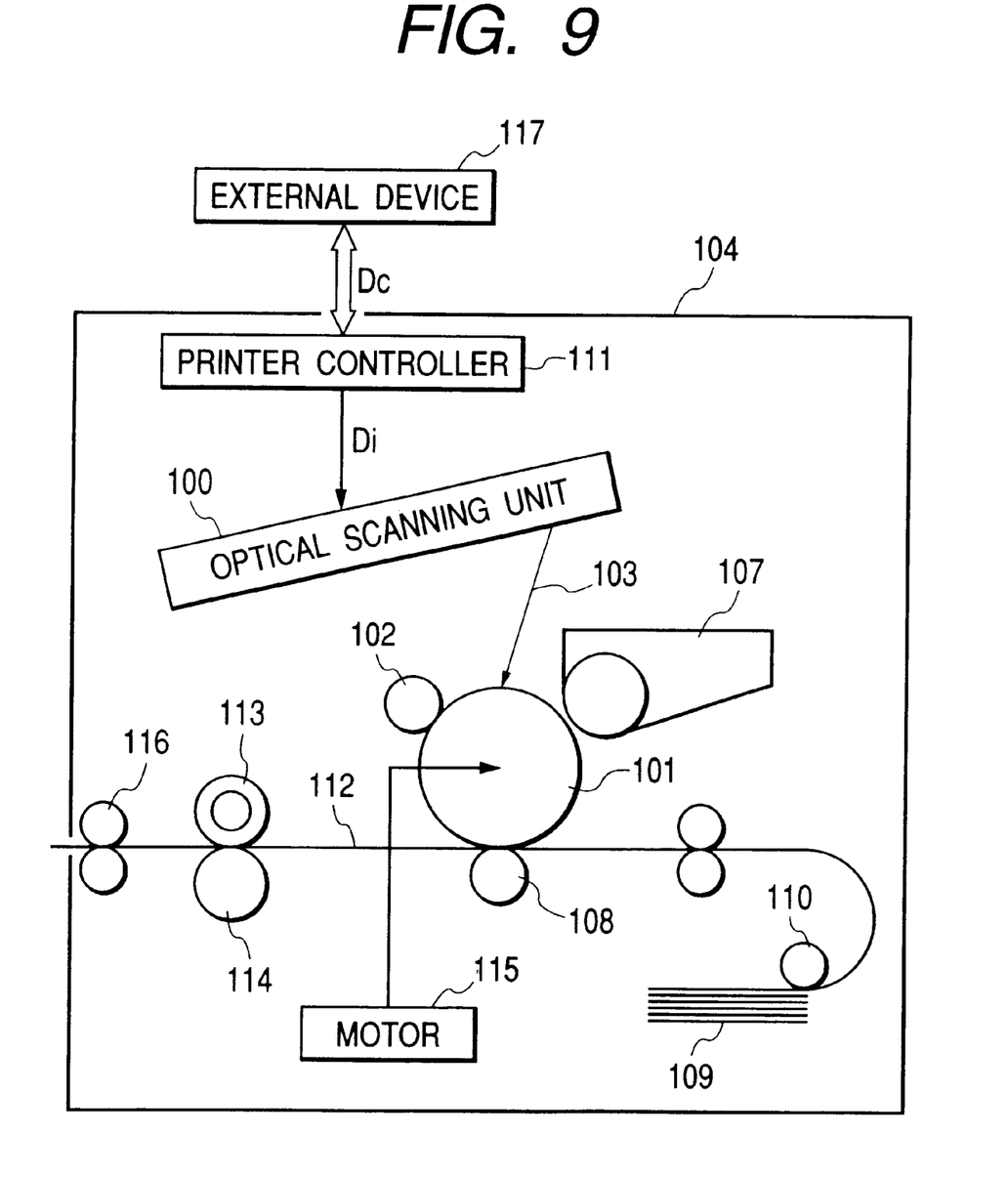
FIG. 9 is a view showing an image forming apparatus according to the present invention.

FIG. 9 is a sectional view of the main part of an image forming apparatus according to an embodiment of the present invention. Referring to FIG. 9, an image forming apparatus 104 receives code data Dc from an external device 117 such as a personal computer. This code data Dc is converted into image data (dot data) Di by a printer controller 111 in the apparatus. This image data Di is input to an optical scanning unit 100 having an arrangement like the one described in each of the first to third embodiments. A light beam 103 modulated in accordance with the image data Di emerges from the optical scanning unit 100, and the photosensitive surface of a photosensitive drum 101 is scanned in the main scanning direction with the light beam 103.

The photosensitive drum 101 serving as an electrostatic latent image carrier (photosensitive member) is rotated clockwise by a motor 115. Upon this rotation, the photosensitive surface of the photosensitive drum 101 moves with respect to the light beam 103 in the sub-scanning direction perpendicular to the main scanning direction. A charging roller 102 for uniformly charging the surface of the photosensitive drum 101 is placed above the photosensitive drum 101 such that the surface of the charging roller 102 is in contact with the photosensitive drum 101. The surface of the photosensitive drum 101 charged by the charging roller 102 is irradiated with the light beam 103 scanned by the optical scanning unit 100.

As described above, the light beam 103 is modulated on the basis of the image data Di. By irradiating the surface of the photosensitive drum 101 with the light beam 103, an electrostatic latent image is formed on the surface of the photosensitive drum 101. This electrostatic latent image is developed as a toner image by a developing unit 107 which is placed downstream from the radiation position of the light beam 103 in the rotational direction of the photosensitive drum 101 so as to be in contact with the photosensitive drum 101.

The toner image developed by the developing unit 107 is transferred onto a paper sheet 112 as a transfer medium by a transfer roller 108 placed below the photosensitive drum 101 to oppose the photosensitive drum 101. The paper sheet 112 is stored in a paper cassette 109 in front of the photosensitive drum 101 (on the right side in FIG. 9). However, a paper sheet can also be manually fed. A feed roller 110 is placed at an end portion of the paper cassette 109 to feed the paper sheet 112, stored in the paper cassette 109, onto a convey path.

The paper sheet 112 on which the unfixed toner image is transferred in the above manner is further conveyed to a fixing unit behind (the left side in FIG. 9) the photosensitive drum 101. The fixing unit is made up of a fixing roller 113 incorporating a fixing heater (not shown) and a press roller 114 which is pressed against the fixing roller 113. The fixing unit fixes the unfixed toner image on the paper sheet 112 conveyed from the transfer unit by heating the paper sheet 112 while pressing it between the fixing roller 113 and the pressing portion of the press roller 114. In addition, a paper discharge roller 116 is placed behind the fixing roller 113 to discharge the image-fixed paper sheet 112 outside the image forming apparatus.

Although not shown in FIG. 9, the printer controller 111 controls the respective components in the image forming apparatus, including the motor 115, and the polygon motor in the optical scanning unit (to be described later) as well as data conversion described above.

The present invention can also be applied a tandem type color image forming apparatus having a plurality of photosensitive drums.

According to the present invention, as described above, there are provided a multi-beam scanning optical system capable of high-speed printing operation, in which a slit member forming one element of a synchronization detection means for controlling the timing at a scanning start position on a scanned surface is set in a proper direction to make the respective light beams travel the same distance from the BD detection positions to the writing start positions with the same delay time, thereby preventing jitter in the main scanning direction, which occurs in a cycle of the number of light beams, and attaining an increase in operation speed and an improvement in image quality, and an image forming apparatus using the multi-beam scanning optical system.

What is claimed is:

1. A multi-beam scanning optical system comprising:
   light source means having a plurality of light-emission points;
   incident optical means for guiding a plurality of light beams emitted from said light source means to deflection means;
   scanning optical means for forming the plurality of light beams reflected/deflected by the deflection means into images on a scanned surface; and
   synchronization detection means in which a part of the plurality of light beams from the deflection means are reflected at a predetermined angle in a sub-scanning cross-section by reflection means to be scanned on a surface of a slit member and to be guided to a surface of a synchronization detection element via the slit member, and a timing at a scanning start position on the scanned surface is controlled by using a signal from the synchronization detection element,
   wherein the slit member is positioned such that a plurality of light beams scanned on a surface of a slit opening are substantially vertically scanned on the slit opening.

2. A system according to claim 1, wherein said synchronization detection means controls a timing at a scanning start position on the scanned surface in a cycle of the plurality of light beams emitted from said light source means.

3. A system according to claim 1, wherein a longitudinal direction of the slit opening of the slit member is nonparallel to a rotational axis direction of the deflection means.

4. A system according to claim 1, wherein the plurality of light-emission points are spaced apart from each other in at least the main scanning direction.

5. An image forming apparatus comprising:
   the multi-beam scanning optical system defined in claim 1;
   a photosensitive member disposed on the scanned surface;
   a developing unit for developing an electrostatic latent image formed on said photosensitive member by a light beam scanned by said multi-beam scanning optical system into a toner image;
   a transfer unit for transferring the developed toner image onto a transfer medium; and
   a fixing unit for fixing the transferred toner image on the transfer medium.

6. An image forming apparatus comprising:
   the multi-beam scanning optical system defined in claim 1; and
   a printer controller for converting code data input from an external device into an image signal and inputting the signal to said multi-beam scanning optical system.

7. A multi-beam scanning optical system comprising:
   light source means having a plurality of light-emission points;
   incident optical means for guiding a plurality of light beams emitted from said light source means to deflection means;
   scanning optical means for forming the plurality of light beams reflected/deflected by the deflection means into images on a scanned surface; and
   synchronization detection means in which a part of the plurality of light beams from the deflection means are reflected at a predetermined angle in a sub-scanning cross-section by reflection means to be scanned on a surface of a slit member and to be guided to a surface of a synchronization detection element via the slit member, and a timing at a scanning start position on the scanned surface is controlled by using a signal from the synchronization detection element,
   wherein the slit member is positioned such that a plurality of light beams scanned on a surface of a slit opening vertically cross one of edge portions of the slit opening.

8. A system according to claim 7, wherein said synchronization detection means controls a timing at a scanning start position on the scanned surface in a cycle of the plurality of light beams emitted from said light source means.

9. A system according to claim 7, wherein a longitudinal direction of the slit opening of the slit member is nonparallel to a rotational axis direction of the deflection means.

10. A system according to claim 7, wherein the plurality of light-emission points are spaced apart from each other in at least the main scanning direction.

11. An image forming apparatus comprising:

the multi-beam scanning optical system defined in claim 7;

a photosensitive member disposed on the scanned surface;

a developing unit for developing an electrostatic latent image formed on said photosensitive member by a light beam scanned by said multi-beam scanning optical system into a toner image;

a transfer unit for transferring the developed toner image onto a transfer medium; and a fixing unit for fixing the transferred toner image on the transfer medium.

12. An image forming apparatus comprising:

the multi-beam scanning optical system defined in claim 7; and a printer controller for converting code data input from an external device into an image signal and inputting the signal to said multi-beam scanning optical system.

13. A multi-beam scanning optical system comprising:

light source means having a plurality of light-emission points;

incident optical means for guiding a plurality of light beams emitted from said light source means to deflection means;

scanning optical means for forming the plurality of light beams reflected/deflected by the deflection means into images on a scanned surface; and synchronization detection means in which a part of the plurality of light beams from the deflection means are reflected at a predetermined angle in a sub-scanning cross-section by reflection means to be scanned on a surface of a slit member and to be guided to a surface of a synchronization detection element via the slit member, and a timing at a scanning start position on the scanned surface is controlled by using a signal from the synchronization detection element, wherein a longitudinal direction of the slit opening of the slit member is nonparallel to a rotational axis direction of the deflection means, and the slit member is positioned such that a plurality of light beams scanned on a surface of a slit opening are substantially vertically scanned in the longitudinal direction of the slit opening.

14. A system according to claim 13, wherein said synchronization detection means controls a timing at a scanning start position on the scanned surface in a cycle of the plurality of light beams emitted from said light source means.

15. A system according to claim 13, wherein the slit member is positioned to be vertical or substantially vertical to a plane formed by a plurality of light beams scanned on the surface of the slit member.

16. A system according to claim 13, wherein the plurality of light-emission points are spaced apart from each other in at least the main scanning direction.

17. An image forming apparatus comprising:

the multi-beam scanning optical system defined in claim 13;

a photosensitive member disposed on the scanned surface;

a developing unit for developing an electrostatic latent image formed on said photosensitive member by a light beam scanned by said multi-beam scanning optical system into a toner image;

a transfer unit for transferring the developed toner image onto a transfer medium; and a fixing unit for fixing the transferred toner image on the transfer medium.

18. An image forming apparatus comprising:

the multi-beam scanning optical system defined in claim 13; and a printer controller for converting code data input from an external device into an image signal and inputting the signal to said multi-beam scanning optical system.

* * * * *